United States Patent
Moran et al.

(10) Patent No.: US 8,522,048 B2
(45) Date of Patent: Aug. 27, 2013

(54) CONTENT DELIVERY SYSTEM

(75) Inventors: Dov Moran, Kfar Saba (IL); Itzhak Pomerantz, Kefar Saba (IL)

(73) Assignee: SanDisk IL Ltd., Kfar Saba (IL)

( * ) Notice: Subject to any disclaimer, the term of this patent is extended or adjusted under 35 U.S.C. 154(b) by 1407 days.

(21) Appl. No.: 11/315,270

(22) Filed: Dec. 23, 2005

(65) Prior Publication Data
US 2006/0236318 A1  Oct. 19, 2006

Related U.S. Application Data

(60) Provisional application No. 60/670,872, filed on Apr. 14, 2005.

(51) Int. Cl.
*G06F 12/14* (2006.01)

(52) U.S. Cl.
USPC ........... 713/193; 713/189; 713/190; 713/191; 713/192; 713/194; 726/1; 726/2; 726/22; 726/26; 726/34

(58) Field of Classification Search
USPC ................. 713/189–194; 726/1–36
See application file for complete search history.

(56) References Cited

U.S. PATENT DOCUMENTS

| | | | |
|---|---|---|---|
| 6,067,622 A | 5/2000 | Moore | |
| 6,742,176 B1 | 5/2004 | Million et al. | |
| 6,880,054 B2 * | 4/2005 | Cheng et al. | 711/164 |
| 6,934,847 B2 | 8/2005 | Ishizaka | |
| 7,530,117 B2 * | 5/2009 | Tanaka et al. | 726/31 |
| 8,108,691 B2 | 1/2012 | Holtzman et al. | |
| 8,321,686 B2 | 11/2012 | Holtzman et al. | |
| 2003/0097596 A1 * | 5/2003 | Muratov et al. | 713/202 |
| 2004/0254888 A1 | 12/2004 | Tanaka et al. | |
| 2005/0055560 A1 * | 3/2005 | Kendon | 713/189 |
| 2005/0114570 A1 * | 5/2005 | Chang et al. | 710/62 |
| 2006/0053250 A1 * | 3/2006 | Saze | 711/114 |
| 2006/0176068 A1 | 8/2006 | Holtzman et al. | |
| 2006/0177064 A1 | 8/2006 | Holtzman et al. | |
| 2007/0188183 A1 | 8/2007 | Holtzman et al. | |

FOREIGN PATENT DOCUMENTS

| | | |
|---|---|---|
| EP | 0 818 748 A2 | 1/1998 |
| EP | 1 089 156 A2 | 4/2001 |
| EP | 1 667 007 A1 | 6/2006 |
| JP | S63-153633 A | 6/1988 |
| JP | 2000-066890 A | 3/2000 |
| JP | 2001-209309 A | 8/2001 |
| JP | 2001-343990 A | 12/2001 |

(Continued)

OTHER PUBLICATIONS

International Search Report for application No. PCT/IL06/00438 issued on Jul. 14, 2008 (3 pages).

(Continued)

*Primary Examiner* — Edan Orgad
*Assistant Examiner* — Roderick Tolentino
(74) *Attorney, Agent, or Firm* — Brinks Hofer Gilson & Lione

(57) ABSTRACT

Code of a software product is delivered by embodying, on a computer-readable storage medium, installation code for installing the software product code on a computer and DRM code for permitting the installation only if a predetermined condition is satisfied. If the condition is violated, the installation code is erased and that part of the storage medium then is available for general use.

21 Claims, 3 Drawing Sheets

(56) References Cited

FOREIGN PATENT DOCUMENTS

| | | | |
|---|---|---|---|
| JP | 2003-044155 A | | 2/2003 |
| JP | 2004-86588 A | | 3/2004 |
| WO | WO03/041364 | | 5/2003 |
| WO | WO 2005/026924 A1 | | 3/2005 |

OTHER PUBLICATIONS

Written Opinion for application No. PCT/IL06/00438 issued on Jul. 14, 2008 (5 pages).
Japanese Office Action issued Mar. 30, 2010 for corresponding Japanese Appln. No. 2008-506049 (8 pgs).
U.S. Appl. No. 60/651,128, filed Feb. 7, 2005.
Office Action issued in U.S. Appl. No. 11/053,273 on Nov. 19, 2008 (19 pages).
Office Action issued in U.S. Appl. No. 11/053,273 on Nov. 9, 2009 (10 pages).
Office Action issued in U.S. Appl. No. 11/053.273 on Jul. 7, 2010 (8 pages).
Office Action issued in U.S. Appl. No. 11/053,273 on Dec. 17, 2010 (7 pages).
Office Action issued in U.S. Appl. No. 11/053,273 on Jul. 12, 2011 (8 pages).
Office Action issued in U.S. Appl. No. 11/053,273 on Feb. 8, 2012 (9 pages).
Office Action issued in U.S. Appl. No. 11/317,390 on Apr. 30, 2009 (13 pages).
Office Action issued in U.S. Appl. No. 11/317,390 on Mar. 17, 2010 (15 pages).
Office Action issued in U.S. Appl. No. 11/317,390 on Aug. 16, 2010 (13 pages).
Office Action issued in U.S. Appl. No. 11/317,862 on Nov. 19, 2008 (17 pages).
Office Action issued in U.S. Appl. No. 11/317,862 on Jul. 6, 2009 (8 pages).
Office Action issued in U.S. Appl. No. 11/317,862 on Feb. 4, 2010 (9 pages).
Office Action issued in U.S. Appl. No. 11/317,862 on Aug. 30, 2010 (9 pages).
Office Action issued in U.S. Appl. No. 11/317,862 on Mar. 16, 2011 (8 pages).
Office Action issued in U.S. Appl. No. 11/317,862 on Oct. 4, 2011 (9 pages).
Office Action issued Mar. 24, 2011 in corresponding Chinese Appln. No. 200680018332.6 (8 pgs).
Supplementary European Search Report issued in corresponding EP App. No. 06728239.2 (10 pgs).

* cited by examiner

CONTENT DELIVERY SYSTEM

This patent application claims the benefit of U.S. Provisional Patent Application No. 60/670,872 filed Apr. 14, 2005.

FIELD AND BACKGROUND OF THE INVENTION

The present invention relates to a content delivery system and a method for content delivery, and more particularly, to a system that allows for control of content access and distribution via a license counter verification protocol which is integral to the system.

The distinction between a consumable product and its container is well-known in the art of commerce. Often a vendor offers a packaged, consumable product whose empty container has some value in itself for the consumer after the product has been consumed. While such bundling of products is feasible for physical products, like cookies in a metal box, or fruits in a straw basket (providing a desirable synergism for the bundling), it is not feasible for selling a one-time, pre-paid license for copyrighted digital content such as a software product.

For the purpose of this disclosure and claims, the terms "software", "software product", and "software product code" include any type of digital content, including but not limited to executable software files, media files intended to be consumed or played by executable programs, or any combination of the two.

Pre-paid digital content is often meant to be licensed for a single installation or for a limited number of uses. Packaging the pre-paid digital content in detachable media such as a CD-ROM or a diskette would enable multiple installations and unlimited usage on many computers. This is typically prevented by applying a post-installation registration process involving communication with a licensing authority. Such registration processes imply that the packaged content, as delivered before licensing, has negligible value for the user in itself; therefore, it does not contribute to the value of the bundle; and thus, it does not provide a desired synergism between two valuable bundled products.

It would be very useful if pre-paid digital content could be bundled with a durable, detachable memory device such as a DiskOnKey™ portable memory available from M-Systems Inc. of Kfar Saba, Israel, to become a joint product, where each of the two components promotes the sales of the other.

SUMMARY OF THE INVENTION

It is the purpose of the present invention to enable the bundling of a durable detachable memory with a pre-paid, limited license to digital content. The system of the present invention enables installation of a limited number of copies, typically one, of the licensed content, and unlimited use of the detachable memory device after the device has exported its content under the license. The bundled product would typically be sold for a price that is less than the sum of its hardware and software components, making it an attractive product in the market.

It is known that a USB flash drive (UFD) such as a DiskOnKey™ available from M-Systems, from Kfar Saba, Israel, referred to herein below as "DOK", can have a relatively large part of its memory available for the user to write and read the user's data using the operating system of the computer, and a relatively small part of its memory exclusively available for an internal controller, residing on the device, to read and write information. We refer herein to these two parts of the memory as "the open memory" which is accessible to the user, and "the closed memory" which is only accessible to the control software of the UFD.

According to the present invention, the UFD is sold to the user with one or more files, saved in the open memory. These files are executable programs, that can be run on a personal computer. Each of these programs, when executed, installs one or more executable programs on the computer and works in a way similar to well-known installation programs such as InstallShield™ of MacroVision, Chicago, Ill., USA. The installed executable software, when run, can play embedded music or can provide other useful software applications. The installed applications or music players cannot be duplicated to another computer because the installation process changes the operating system files in a way that is typically unknown to the user. They can only be installed using the above-mentioned installing software.

The installing programs that are provided in the UFD are programmed to run only if two conditions related to the UFD are met: A UFD with a specific, read-only serial number has to be connected to the computer, and a license counter, that is stored in the closed memory of the UFD, must have a value that is higher than 0.

If either one of these two conditions is not met, the installing software will not run, and no further installation of the digital content is allowed. The only useful application of the UFD will then be to become a portable memory for the user's files, which is actually the ordinary intention of such products.

Optionally, the licensing process of the digital content includes a post-installation licensing process by which the user obtains a password from a licensing authority. Such post-installation licensing can be used to sell optional components or upgrades, or to extend the original license, if the original license was limited, for an extended period or an extended number of uses.

The digital content can be composed of one or more separate items, that can be consumed by the user simultaneously or sequentially. Each of the content items can have its own counter, so that the consumption of one of them does not affect the right to use the others.

The present invention ensures the compliance of the user with the terms of the content license by preventing at least the following possible attempts to bypass the license restrictions:

1. Excessive installations of the content from the UFD are prevented by the license counter that is not accessible to the user and tells the installation program that the number of permitted installations has been exhausted.
2. Copying the installable content to another memory, and attempting to install the content from there into another computer, will fail because the installation program will not run unless a specific, read-only serial number is found in the UFD that is connected to the computer.
3. Copying the installable content into another "virgin" UFD, that may carry a much less expensive content, and attempting to use the limited installation license of the other UFD to install the expensive content instead of the inexpensive content, will fail as the installation program requires a specific serial number of the specific UFD on which the content has been delivered to the user.
4. Duplicating the content after its installation to another computer, and running the content there, is prevented by the ordinary protection of installable programs that cannot be copied and have to be properly installed by an installing program as in the prior art of InstallShield™.
5. Playing the music that was delivered with the UFD by a general purpose player, such as a commercial MP3 player, is prevented because the music is embedded within executable code and does not exist in a stand-alone playable format.

Therefore, according to the present invention, there is provided a system for content delivery that allows for control of content access and distribution via a license counter verification protocol which is integral to the system.

The system includes a memory storage device having a first mode of operation which operates as a software delivery system, and a second mode of operation which operates as a portable memory device, where transition from the first mode to the second mode of operation is irreversible and takes place when a predetermined condition is not satisfied.

According to further features in the described, preferred embodiments, the memory storage device has software code stored on the memory. The software code includes installation software and digital-rights management (DRM) software for controlling the access and distribution of the software product.

According to further features in preferred embodiments of the invention described below, the software product may be an application, text-to-speech converter, a movie player, a media player, and/or digital media (such as text, movie, and/or music files) embedded within a text-to-speech converter, movie player, media player.

According to further features in the described, preferred embodiments, the DRM software includes: (a) program code for determining a value of a parameter related to the delivery history of the specific copy of the software product on the memory storage device, (b) program code for determining, based on the parameter's value, if a predetermined condition is satisfied, and (c) program code for disabling any installation of the software product on any computer if the condition is violated.

According to further features in the described preferred embodiments, the parameter is determined by a read-only serial number.

According to further features in the described preferred embodiments, the predetermined condition is determined by a value of a counter.

According to further features in the described preferred embodiments, the value of the counter is less than a predetermined number of successful installations of the software product.

According to further features in the described preferred embodiments, the predetermined condition includes a match between the parameter and a parameter embedded within the installation software. For the purpose of this disclosure, a "match" is any correspondence of the two parameter (e.g. a multiple of the parameter), not just identity, that permits determination whether installation is allowed.

According to further features in the described preferred embodiments, in the case that the condition is violated, the DRM software erases the installation software from the memory storage device, thereby making available storage space for user files.

According to further features in the described preferred embodiments, the content delivery system includes a memory controller for performing operations associated with the installation and DRM software.

According to further features in the described preferred embodiments, the content delivery system includes a flash memory.

According to another aspect of the present invention, there is provided a method for delivering software, which includes providing a memory storage device and enabling a first mode of operation which operates as a software delivery system, and a second mode of operation which operates as a portable memory device, where transition from the first mode to the second mode of operation is irreversible and takes place when a predetermined condition is not satisfied.

According to another aspect of the present invention, there is provided a method for delivering software, which further includes providing installation and DRM software on the memory storage device for permitting installation of a software product only if a predetermined condition is satisfied. Satisfaction of the predetermined condition may be determined by the computer, or alternatively, by a controller on the memory storage device.

According to another aspect of the present invention, there is provided a method for delivering software which includes: (a) providing a memory storage device that includes installation and DRM software for permitting installation of a software product only if a predetermined condition, that depends on at least one parameter that can be read from the memory storage device, and is one of a counter of installations and a serial number, is satisfied, (b) erasing the software program, installation software, and/or DRM software once the allowable installations have been consumed, and (c) subsequent to the erasure of the software, allowing access to the memory storage device by the user in order to make the storage device memory available for storage of user files.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system and a method for content delivery. Specifically, the present invention can be used to deliver content, such as software, with license control over the number of installations that can be performed. The principles and operation of a content delivery system according to the present invention may be better understood with reference to the drawings and the accompanying description.

Figure 1A:
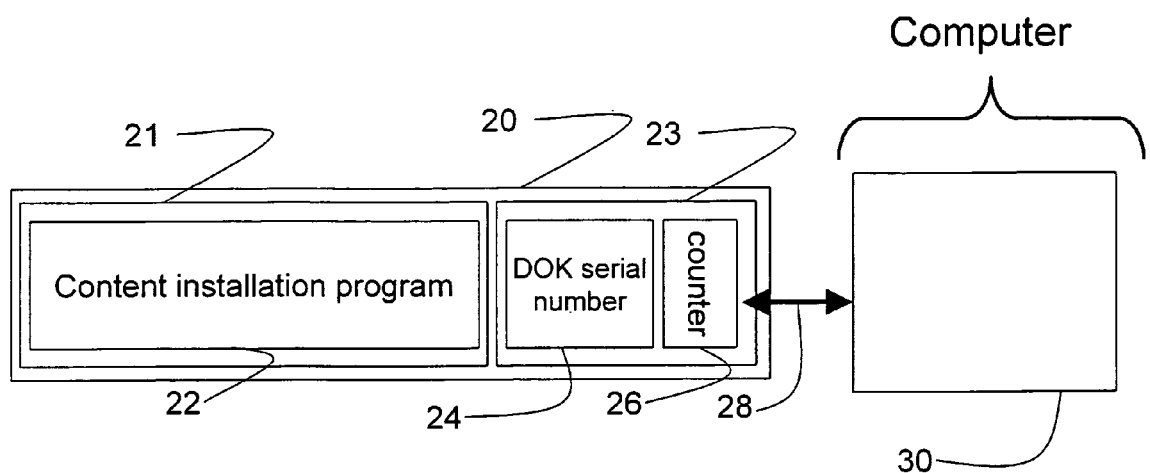
FIG. 1A is a simplified block diagram of a content delivery system of the present invention connected to a computer, showing the relevant memory areas of the system before the installation license has expired.

Referring now to the drawings, FIG. 1A is a schematic block diagram of a UFD 20 that has a memory that is logically divided into a open memory 21 and closed memory 23. The open memory 21 contains the content 22. The closed memory 23 contains control software (not shown), a unique UFD serial number 24, and a license counter 26 that is preset to the number of allowable installations—typically one installation. The UFD 20 can be connected to a computer 30, such as a personal computer, via a port 28—such as a USB port.

Figure 1B:
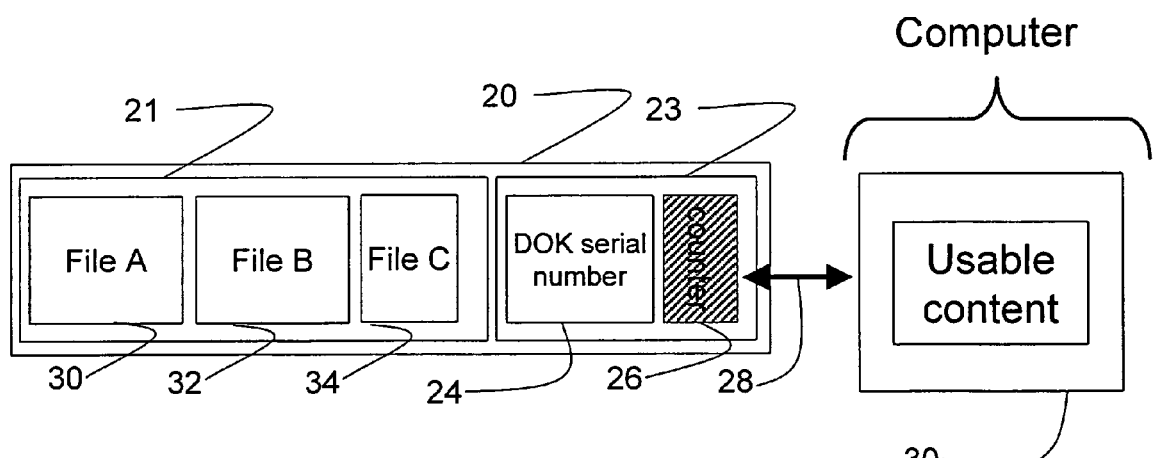
FIG. 1B is a simplified block diagram of a content delivery system of the present invention connected to a computer, showing the relevant memory areas of the system after the installation license has expired.

FIG. 1B is the same UFD 20 as in FIG. 1A after the installation license has been exhausted. Counter 26 is set to zero and does not allow any further installations. Open memory 21 is now available to the user for storing user files 30, 32, and 34.

Figure 2:
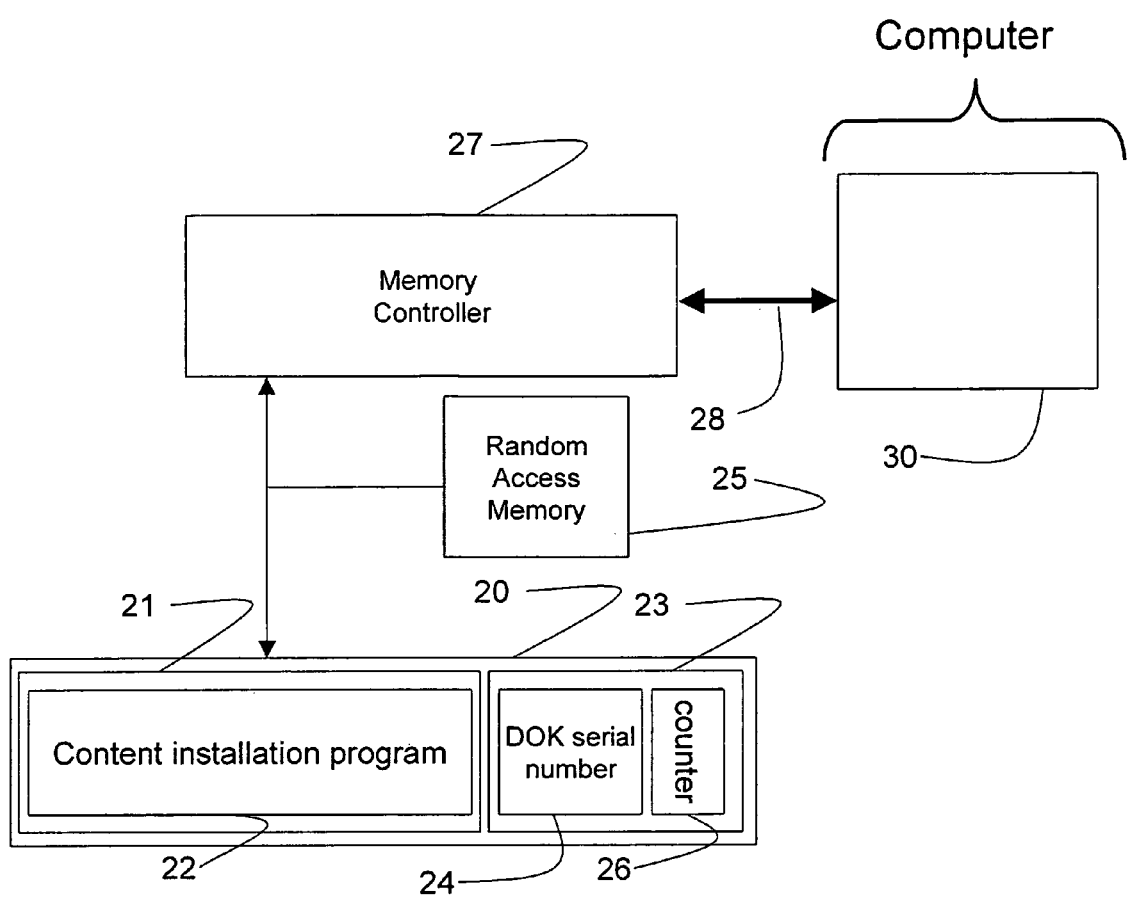
FIG. 2 is a simplified block diagram of a content delivery system of the present invention, further including a random access memory associated with the content delivery system and a memory controller connecting the content delivery system to the computer, and showing the relevant memory areas of the system before the installation license has expired.

FIG. 2 is a schematic block diagram of a UFD 20 as in FIG. 1A further including: a random access memory 25 associated with the UFD 20 and a memory controller 27 connecting the UFD 20 to the computer 30. It will be appreciated that memory controller 27 functions may be carried out in software, firmware, or hardware, and would not necessarily exist as a physically separate unit as the drawing suggests. FIG. 2 is based on FIG. 1 of U.S. Pat. No. 5,404,485, which is incorporated by reference for all purposes as if fully set forth herein.

Figure 3:
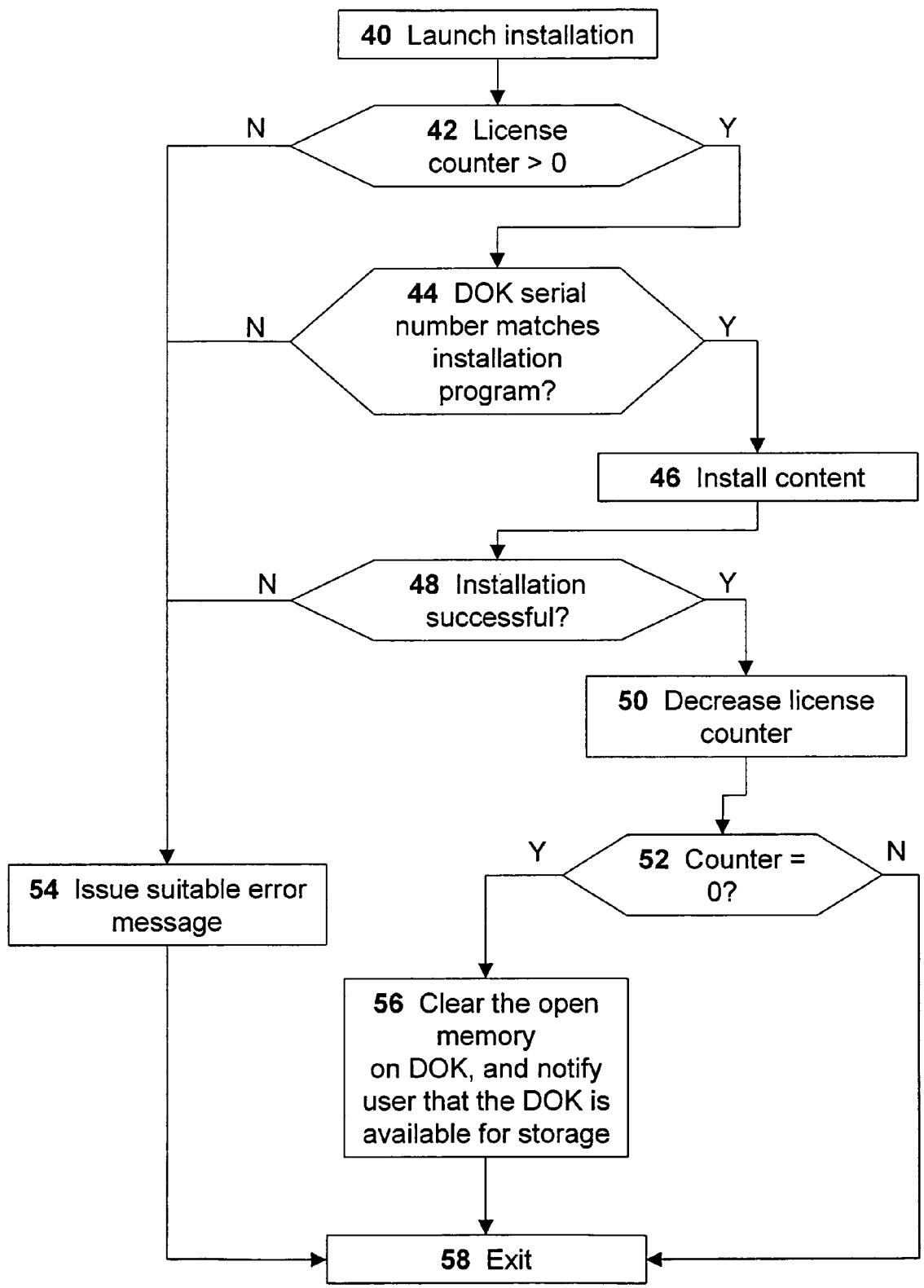
FIG. 3 is a simplified flowchart of the installation process of the present invention.

FIG. 3 is a flowchart of the license counter verification protocol used by the system to control access and distribution of content, and will be used to describe the sequence of steps in the installation process below.

FIG. 1A and FIG. 2 depict the UFD 20 in the way it is sold to the user, with the content 22 loaded to the open memory 21, and license counter 26 set to a positive number that can be 1 or higher.

Following through the flowchart of FIG. 3, when the user connects UFD 20 to computer 30 and launches installation program 22 through a command of the operating system (not shown) of computer 30, installation program 22 is launched (Block 40). The program 22 confirms that license control counter 26 is positive (Block 42) and that UFD 20 with the correct serial number 24 is connected to computer 30 (Block 44), and then installs the content 22 on computer 30 (Block 46). If either condition is not met, program 22 issues a suitable error message (Block 54) and exits (Block 58).

Upon successful installation (Block 48), license counter value 26 is decreased by 1 (Block 50). Subsequently, a license counter check is done to determine if the value is zero (Block 52). The program 22 then either exits (for values greater than zero allowing for future installations) (Block 58), or clears the open memory 21 on UFD 20 and notifies the user that UFD 20 is available for storage (Block 56).

If the content 22 is a software program intended to be installed on one computer 30 only, the control program sets license control counter 26 to zero, and prevents any further installations of the software. If the content 22 is intended for more than one installation, license counter 26 is stepped down by one count after each installation until it reaches zero, which will stop the distribution of the software.

While the invention has been described with respect to a limited number of embodiments, it will be appreciated that many variations, modifications, and other applications of the invention may be made. Among the possible variations, there are configurations where: the memory is a flash memory, the license counter verification protocol can be performed within a computer, or the software product is an application, a text-to-speech converter, a movie player, a media player, or a digital media embedded in a text-to-speech converter, a movie player, and/or a media player. In addition, a further configuration would allow the user access to the UFD memory after erasure of the software program, installation software, and/or DRM software, once the allowable installations have been consumed, in order to make the UFD memory available for storage of user files.

What is claimed is:

1. A storage device comprising:
a memory; and
a hardware controller in communication with the memory, wherein in a first mode, the controller is configured to execute content delivery software to check for a predetermined condition prior to transmitting protected data to a computer in order to operate as a content delivery system, the predetermined condition indicative of whether to allow transmission of the protected data to the computer,
wherein, when the predetermined condition is no longer satisfied, the controller is configured to transition from the first mode to a second mode by permanently preventing execution of the content delivery software to check for the predetermined condition, wherein the transition is irreversible;
wherein in the second mode, the storage device is not configured to execute the content delivery software to check for the predetermined condition, and
wherein in the second mode, the storage device is configured to operate as a memory device to transfer data from the memory to the computer without checking for the predetermined condition.

2. The storage device of claim 1 wherein the protected data comprises a software product code;
wherein the controller comprises:
installation program code for installing the software product code on the computer; and
digital-rights management program code for permitting the installation of the software product code only if the predetermined condition is satisfied.

3. The storage device of claim 2, wherein the software product code includes an application.

4. The storage device of claim 2, wherein the software product code includes a text-to-speech converter.

5. The storage device of claim 4, wherein digital media are embedded within the text-to-speech converter.

6. The storage device of claim 2, wherein the software product code includes a movie player.

7. The storage device of claim 6, wherein digital media are embedded within the movie player.

8. The storage device of claim 2, wherein the software product code includes a media player.

9. The storage device of claim 8, wherein digital media are embedded within the media player.

10. The storage device of claim 2, wherein the predetermined condition is one of a counter of installations and a serial number.

11. The storage device of claim 2, wherein the predetermined condition includes a value of a counter indicating that a number of successful installations of the software product code is less than a predetermined number.

12. The storage device of claim 2, wherein the digital-rights management program code erases the installation program code after the permitted installations thereof have been exhausted.

13. The storage device of claim 1, wherein in the second mode, the protected data is erased.

14. The storage device of claim 1, wherein controller is configured to permanently prevent execution of the software by erasing the software.

15. A method for managing a storage device having a hardware controller, the method comprising:
in the storage device:
operating the controller in a first mode as a content delivery system by executing content delivery software wherein, prior to transmitting protected data to a computer, the controller executes the content delivery software in order to check for a predetermined condition, the predetermined condition indicative of whether to allow transmission of the protected data to the computer;

transitioning from the first mode to a second mode of operation by permanently preventing execution of the content delivery software, the transition occurring when the predetermined condition is no longer satisfied, wherein the transition is irreversible; and operating the controller in a second mode as a memory device using memory functionality, the controller in the second mode being configured to transfer data from the storage device to the computer without checking for the predetermined condition, wherein in the second mode, the storage device is not configured to execute the content delivery software to check for the predetermined condition.

16. The method of claim 15, wherein the protected data comprises a software product code;

and wherein transmitting the protected data to the computer comprises sending the software product code to the computer for installation.

17. The method of claim 16, wherein the predetermined condition is one of a counter of installations and a serial number.

18. The method of claim 16, wherein the storage device includes installation program code for installing the software product code on the computer; and further comprising erasing the installation program code after permissible installations thereof have been exhausted.

19. The method of claim 15, further comprising, after entering the second mode, notifying a user that the storage device is available for storage.

20. The method of claim 15, further comprising erasing the protected data when the predetermined condition is no longer satisfied.

21. The method of claim 15, wherein permanently preventing execution of the software for checking for the predetermined condition comprises erasing the software.

* * * * *